Patented Dec. 30, 1924.

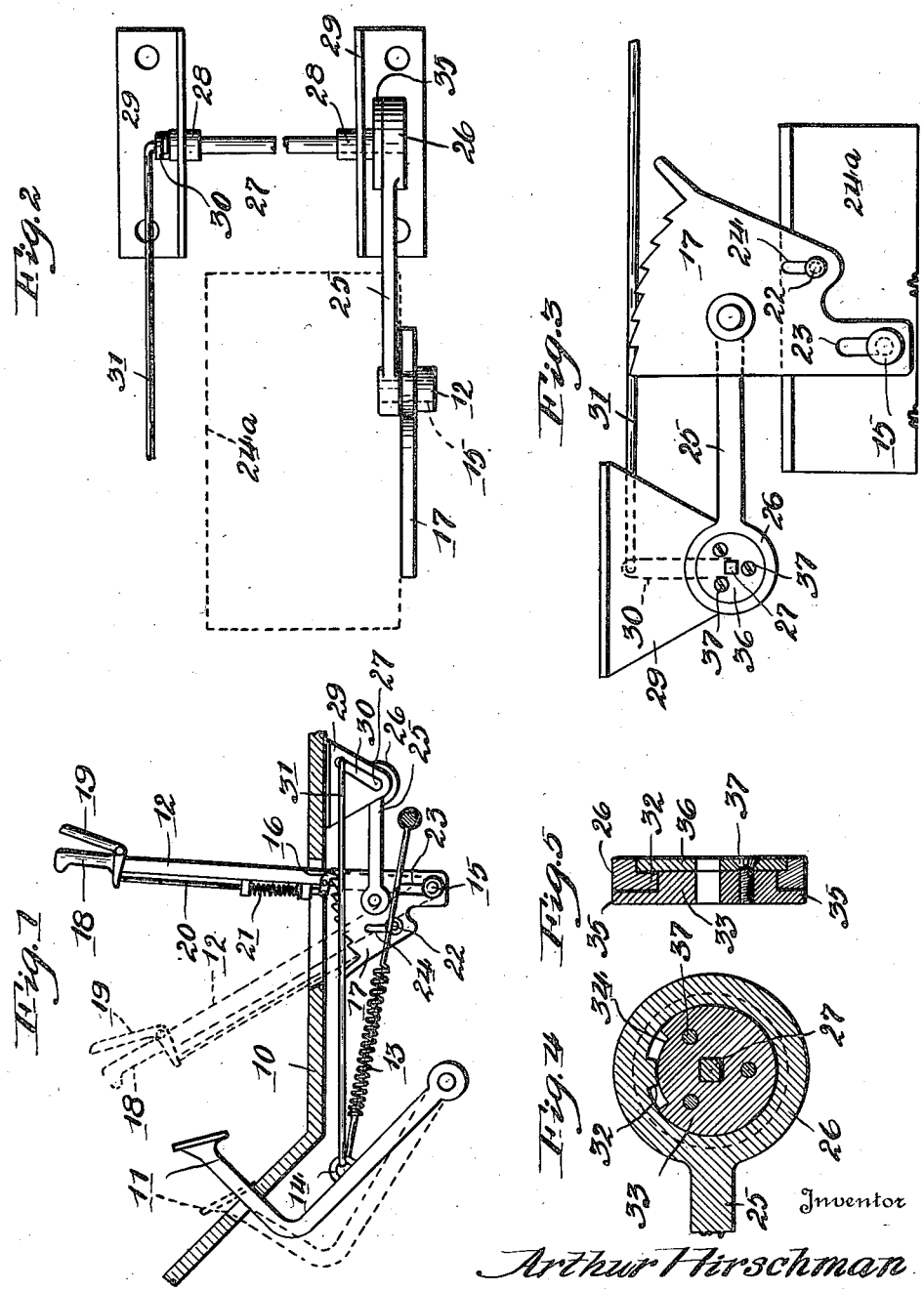

1,520,818

UNITED STATES PATENT OFFICE.

ARTHUR HIRSCHMAN, OF ST. PAUL, MINNESOTA.

BRAKE-RELEASE ATTACHMENT FOR AUTOMOBILES.

Application filed October 29, 1923. Serial No. 671,450.

*To all whom it may concern:*

Be it known that I, ARTHUR HIRSCHMAN, a citizen of the United States, residing at St. Paul, in the county of Ramsey and State of Minnesota, have invented new and useful Improvements in Brake-Release Attachments for Automobiles, of which the following is a specification.

The object of this invention is to facilitate driving automobiles and at the same time to prevent unnecessary wear on brakes and consequent strain on driving mechanism by providing simple and efficient means which operates automatically whenever the vehicle is started to release the hand or emergency brake.

More particularly, is my object to provide an attachment adapted to be applied to any of the common types of automobiles whereby the clutch is so connected with the hand or emergency brake that the latter will be automatically released when the clutch is operated.

My invention also includes novel features of construction which will be more fully pointed out in the following specification and claims.

The accompanying drawings illustrate the best form of my device at present known to me. In the drawings, Figure 1 is a fragmentary section through the floor of an automobile, showing my device attached thereto; Fig. 2 is a bottom view of the device detached from the vehicle; Fig. 3 is a side elevation of the same showing the side opposite the one illustrated in Fig. 1; Fig. 4 is a detail vertical section through the head of the arm for transmitting motion to the brake quadrant, and Fig. 5 is a vertical section through said head taken at right angles to the one shown in Fig. 4.

In the drawings I have used the numeral 10 to indicate the floor of an automobile of common type, said floor being formed with slots through which the clutch lever 11 and hand or emergency brake lever 12 project. The lever 11 is normally held in elevated or operative position by a tension spring 13 connected at one end to an eye 14 on the lever 11 and fixed at its other end to the frame of the vehicle. The lever 12 is pivoted upon a pin 15 and arranged to be maintained in any desired operative or braking position by a dog 16 which engages a toothed quadrant or segment 17. Pivoted near the base of a grip 18 on a lever 12 is a small lever 19 connected by a rod 20 with the dog 16 whereby the latter may be withdrawn from engagement with the teeth on the quadrant 17. A small compression spring 21 normally holds the dog 16 in engagement with the quadrant 17 and the lever 12 is normally maintained in the forward or released position shown in dotted lines in Fig. 1 by a spring usually located near or within the brake drums and therefore not shown in the drawings.

To release the brake whenever the clutch is operated, I provide mechanism connected to the lever 11 whereby the quadrant 17 is moved downward out of engagement with the dog 16. The quadrant 17 is slidable vertically upon the pin 15 and upon a bolt 22, said pin and bolt being inserted respectively through slots 23 and 24 in said quadrant. Any suitable support for the bolts 15 and 22 may be provided. As illustrated in Figs. 2 and 3, the quadrant 17 is secured to one lateral face of the transmission gear case 24ª of the vehicle. An arm 25 is pivotally joined to the quadrant 17 at one end and is connected by a head 26 to a horizontal shaft 27 at its other end. The latter shaft is journaled in bearings 28 in a pair of suitable brackets 29 adapted to be secured to the bottom of the floor 10. A crank arm 30 fast on the shaft 27, is joined by a rod 31 to the eye 14 on the lever 11.

The head 26 on the arm 25 is adapted to cause said arm to be tilted when the shaft 27 is turned through a substantial arc but allows limited movement of said shaft without moving said arm. The head 26 is a ring formed with a lug 32 (Figs. 4 and 5) and arranged to be actuated by a disc 33 having a peripherial groove 34 into which said lug projects. The disc 33 is fixed on a squared end of the shaft 27 and has a flange 35 against which the head 26 abuts. A plate 36, fastened by screws 37 to the disc 33, holds the head 26 upon the periphery of said disc.

*Operation.*

The hand lever 12 is adapted to be placed in the full line position shown in Figure 1 when the automobile is stationary to thereby apply the brake. When the vehicle is to be started, to connect the motor with the drive wheels, it is necessary to place the proper transmission gears in mesh, and to do this while the motor is running, the clutch 11 must be depressed against the action of the spring 13. As the clutch 11 is moved toward the dotted line position shown in Fig. 1, the rod 31 is drawn forward and, by means of the crank arm 30, turns the shaft 27 through a predetermined arc. The disc 33 is thus turned to strike the lug 32 with the end of the groove 34, when the head 26 is rotated to tilt the arm 25. This, as will be readily understood, moves the toothed segment 17 downward out of engagement with the dog 16, so that the lever 12 is freed and the brake released. When the clutch lever 11 is allowed to return to the full line position shown in Figure 1, the above described operation is reversed and the lug 32 coming in contact with the opposite end of the groove 34 will return the segment 17 to normal position. The brake lever 12 may now be manipulated at the will of the driver without affecting the clutch.

It is to be noted that limited movement of the clutch lever 11 is permitted without affecting the brake by reason of the fact that the disc 33 is free to turn through a small arc before the ends of the groove 34 strike the lug 32. This arrangement has the advantage of obviating the necessity of making exact adjustments of the brake release mechanism relative to the throw of the clutch. In use, the clutch spring 13 supports the ratchet 17 as well as the lever 11. Obviously, it is impossible to strain the driving mechanism and wear out the brake by driving with the brake applied where the present invention is used on a car.

Having described my invention what I claim as new and desire to protect by Letters Patent is:

1. In an attachment for an automobile having a clutch lever and a normally inoperative brake, means for maintaining said brake in applied position, and means connected to and actuated by said clutch lever for releasing said brake.

2. In an attachment for an automobile having a clutch lever and a normally inoperative brake, toothed means for maintaining said brake in applied position, and mechanism operatively connecting said clutch lever with said toothed means whereby said means are actuated to release said brake when said clutch is manipulated.

3. An attachment for an automobile having clutch and brake levers comprising, a dog on said brake lever, a segment adapted to be engaged by said dog to maintain said lever in position to apply the brake, said brake being normally inoperative, and means connected to said clutch lever whereby said segment is moved out of engagement with the said dog when said clutch lever is actuated.

4. An attachment for an automobile having brake and clutch levers comprising, brackets adapted to be rigidly mounted on the automobile, a shaft journaled in said brackets, means adapted to turn said shaft when said clutch lever is actuated, a dog on said brake lever, a toothed segment arranged to be moved into and out of engagement with said dog, and an arm connecting said shaft with said segment whereby said segment is actuated to release said dog when the clutch is operated.

5. An attachment for an automobile having brake and clutch levers comprising, brackets adapted to be rigidly mounted on the automobile, a shaft journaled in said brackets, a crank on said shaft, a rod joining said crank to said clutch lever, a dog on said brake lever, a segment arranged to be moved into and out of engagement with said dog, and an arm connecting said shaft with said segment whereby said segment is moved to release said dog when said clutch lever is actuated.

In testimony whereof, I have hereunto signed my name to this specification.

ARTHUR HIRSCHMAN.